Patented Mar. 2, 1937

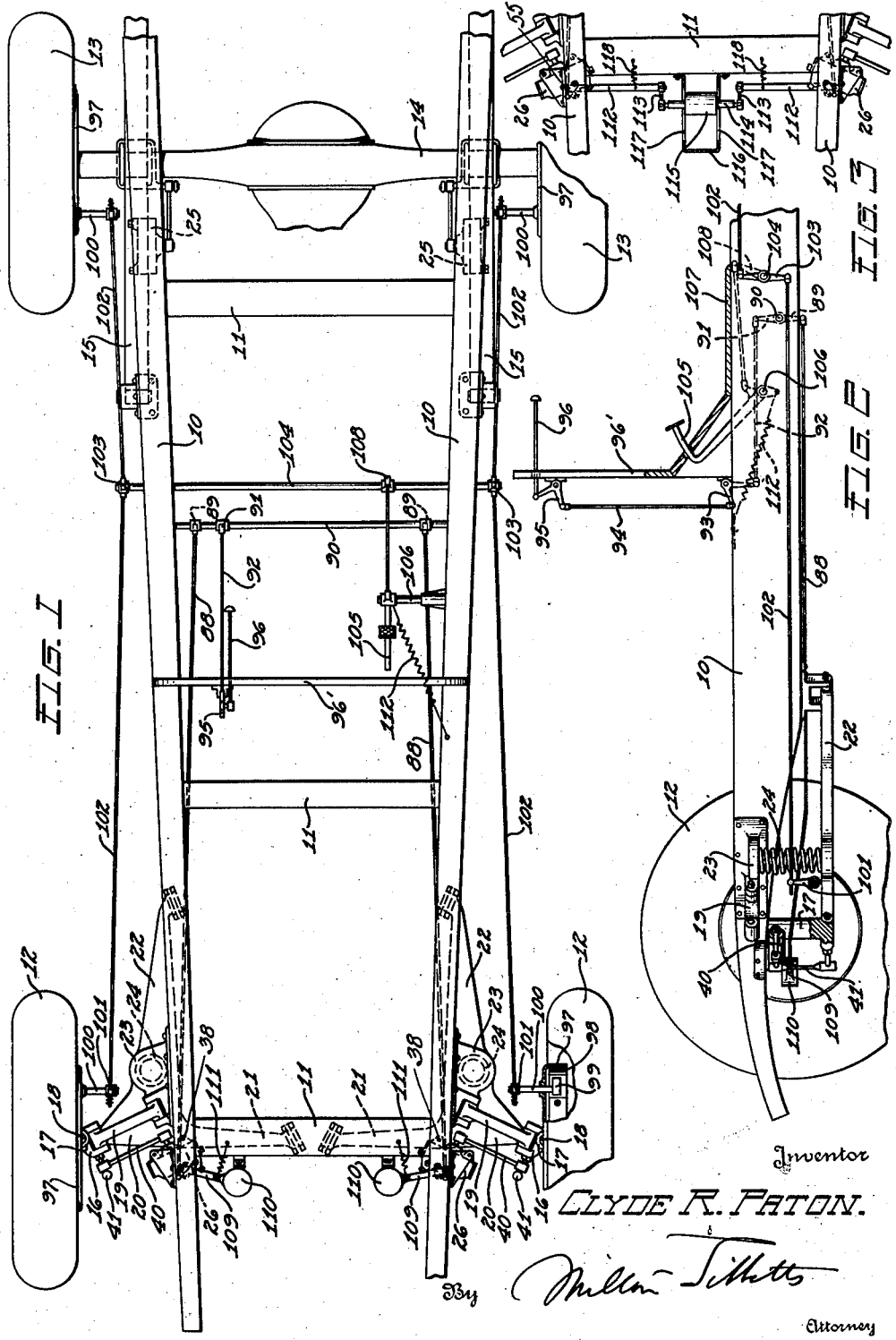

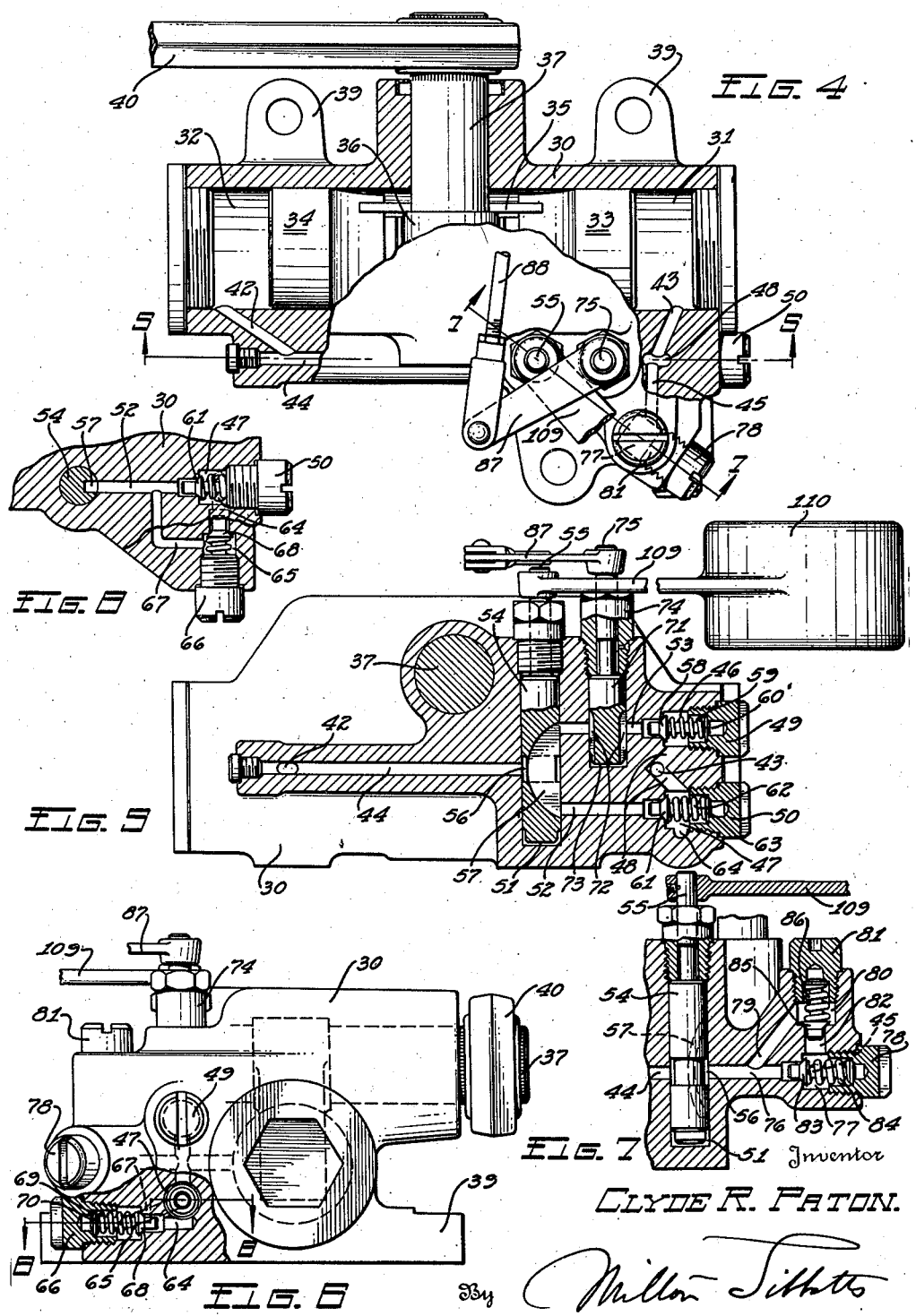

2,072,181

UNITED STATES PATENT OFFICE 2,072,181

SHOCK ABSORBER CONTROL MECHANISM

Clyde R. Paton, Birmingham, Mich., assignor to Packard Motor Car Company, Detroit, Mich., a corporation of Michigan Application July 26, 1934, Serial No. 737,027

7 Claims. (Cl. 188—88)

This invention relates to motor vehicles and more particularly to suspension mechanism for motor vehicles.

It is customary to equip motor vehicles with spring suspension means between the wheel carriers and the body supporting frame and to provide shock absorbers which are arranged in a relation to offer resistance to vertical movement of the wheel carriers and the frame relatively. Ordinarily the shock absorbers are of the fluid type and valve means is provided to regulate the fluid flow so that the resistance offered to spring movement can be varied. In order that the ride may be comfortable for occupants of vehicles, the spring suspension is relatively flexible and the shock absorber valves are set so that the resistance offered thereby is relatively low.

With such form of suspension mechanism, application of the brakes tends to cause the front of the body supporting frame to move toward the wheel carriers, which is commonly known as diving. This diving of the body is objectionable to occupants of the vehicle and it is dangerous because of difficulty encountered in steering at such times as it occurs.

An object of the invention is to provide a motor vehicle suspension system in which resistance to movement between the wheel carriers and the frame relatively is increased during vehicle deceleration.

Another object of this invention is to provide a vehicle suspension system including shock absorbers in which the resistance to flow is automatically regulated so that high resistance is offered to relative vertical movement between the wheel carriers and the frame when the vehicle brakes are applied.

Still another object of the invention is to provide hydraulic shock absorbers for motor vehicles in which the fluid flow is restricted by inertia operated valve means effective only during vehicle deceleration.

Other objects of the invention will appear from the following description taken in connection with the drawings, which form a part of this specification, and in which:

Fig. 1 is a plan view, partly in section and partly broken away, of a motor vehicle chassis having my invention incorporated therewith;

Fig. 2 is a side elevational view of the forward end of the same with one of the wheels broken away in order to more clearly illustrate the suspension system;

Fig. 3 is a fragmentary plan view of the forward end of a motor vehicle having a modified form of my invention associated therewith;

Fig. 4 is a plan view, partly broken away and partly in section, looking at the bottom of a shock absorber as assembled in Fig. 1;

Fig. 5 is a sectional view of a shock absorber taken on line 5—5 of Fig. 4;

Fig. 6 is an end elevational view of a front shock absorber, partially broken away, illustrating one of the control valves;

Fig. 7 is a sectional view taken on line 7—7 of Fig. 4;

Fig. 8 is a sectional view taken on line 8—8 of Fig. 6.

Referring now to the drawings by characters of reference, side sills 10 and cross brace members 11 form a relatively rigid motor vehicle main frame. Associated with the frame are front steering road wheels 12 and rear traction road wheels 13, the last mentioned wheels having drive mechanism within the axle housing 14 connected therewith in a conventional manner.

Between the frame and the road wheels is provided a suspension system consisting generally of spring means and fluid shock absorbers. The rear axle housing 14 is fixed to a central portion of a pair of longitudinally extending leaf springs 15, such springs being connected to the side sills 16 in the conventional manner.

The steering wheels are shown as independently connected with the main frame. Each wheel supporting structure includes an axle yoke 16 to which a knuckle 17 is pivotally connected by a king pin 18, the knuckle being provided with the usual spindle on which the wheel is rotatably mounted. A pair of superposed connectors 19 and 20 are pivoted at one end to each yoke, the upper connectors 19, which are in the form of links, being pivoted at their inner end to the adjacent side sill of the frame. The lower connectors 20 are triangular in form, each having a leg 21 pivoted at its end to the front cross frame member and a rearwardly extending leg 22 pivoted to the adjacent side sill of the frame. A bracket 23 projects laterally from each side sill above the lower connectors 20 and coil springs 24 are mounted therebetween.

Between the rear axle 14 and the side sills of the main frame are shock absorbers 25 which can be of any conventional type but are preferably of the hydraulic type. Between each steering wheel supporting structure and an adjacent portion of the main frame is arranged a shock absorber 26 having an adjustable feature whereby resistance to vertical movement of the frame and the wheels respectively can be varied or substantially shut off.

The same characters of reference will apply to both front shock absorbers and I will now describe one of them. The casing 30 is formed with two axially aligned horizontally extending chambers 31 and 32 in which pistons 33 and 34 are mounted for reciprocation. The pistons are secured to move in unison by means of a connector 35 and between the adjacent ends of the pistons is a cam head 36 forming one end of shaft 37 which projects through the wall of the casing. The shock absorber is fixed to the main frame by means of bolts 38 which pass through openings in brackets 39 projecting from the casing. An arm 40 is fixed to the end of the shaft projecting from the casing and a link 41 connects the arm with the axle yoke 16. Relative vertical movement of the frame and front wheel supporting structures will transmit a similar movement to links 41 which will rock the shaft and turn the cam end thereof so that the pistons will be reciprocated in the casing.

Communication is established between the ends of the chambers 31 and 32 through a series of passages and valve means located in and carried by the shock absorber casing. A passage 42 leads from the chamber 32 and a passage 43 leads from the chamber 31. The passage 42 joins the passage 44 extending parallel with the axis of the chambers while the passage 43 connects with an angular passage 45 extending substantially transversely to the axis of the pistons. A pair of chambers 46 and 47 are formed in the end of the casing adjacent the passage 43 and are connected therewith by the passage 48. These chambers are closed at their outer ends by screw plugs 49 and 50, which are axially adjustable in the end wall of the casing. The chamber 47 is connected with the valve chamber 51 by means of a passage 52 and leading from the chamber 46 to the valve chamber 51 is a passage 53. The passage 44 also connects with the valve chamber 51 and the valve 54 in such chamber is formed to control communication between the passage 44 and the passages 52 and 53 so that flow between the chambers 31 and 32 will be either established or cut off. The valve 54 is rotatably mounted in the chamber 51 and an end 55 projects exteriorly of the casing for the purpose of connection with adjusting mechanism, a suitable bushing 55' being employed to retain this valve axially in the casing. The valve is formed with a circular recess 56 which is open to the passage 44 and it is also provided with an axially extending slot 57 of sufficient length to establish communication between the passages 52 and 53, such slot intersecting the annular groove. It is obvious that rotation of the valve 54 will establish communication between the passage 44 and the passages 52 and 53 or it will cut off such communication.

In the chamber 46 is a valve member 58 having a head engaging the shoulder at the junction of the passage 53 and the end of the chamber adjacent thereto, such valve being normally seated by a coil spring 59 which is held in compression through engagement with the valve head and a washer or retainer 60 bearing against the inner end of the plug 49. There is a similar valve 61 in the chamber 47 and it is provided with a head portion which engages the shoulder at the junction of the passage 52 and the chamber 47. This valve also has a head normally seated by a spring 62 which bears against the valve head and a washer or retainer 63 seated against the inner end of the plug 50. These valves 58 and 61 open and close in the same direction but the spring 62 exerts much greater force than does the spring 59.

Communicating with the chamber 47 is a passage 64 which leads to a chamber 65 closed at its outer end by an axially adjustable screw plug 66. The passage 52 and the chamber 65 are connected by passage 67. In the chamber 65 is a valve 68 which seats against the shoulder formed by the junction between the chamber 65 and the passage 64, such valve being normally held closed by a spring 69 which engages the valve head and a retainer 70 bearing against the inner end of the plug 66. The force exerted by this spring is similar to that exerted by the spring 62. This valve 68 opens in a direction opposite to that in which the valves 58 and 61 open.

When the valve 54 is adjusted so that the slot 57 registers with the passages 52 and 53, then such passages will be in communication with the passage 44 and fluid can pass from the chamber 31 to the chamber 32 through the passages 43 and 48, the chamber 47, the passage 64, the chamber 65, passages 67, 52, 44 and 42. Likewise with the valve 54 regulated as just stated, fluid can move from the chamber 32 to the chamber 31 through passages 42, 44 and 52, the chamber 47, and passages 48 and 43 and it can also flow from the passage 44 through the passage 53, the chamber 46, and the passages 48 and 43. Small rebound vertical movements of the wheel supporting structure and the frame relatively will cause the piston 34 to move toward the left, as viewed in Fig. 3, creating pressure against the fluid in the shock absorber to open the valve 58 so that small flow can pass thereby and, under such circumstances, the spring 62 will not permit opening of the valve 61. When such relative vertical movement obtains greater proportions, then the piston 34 will create sufficient pressure against the fluid in the shock absorber 32 to open both valves 61 and 58. When the piston 33 is moved toward the right, as viewed in Fig. 4, it will force the valve 68 open so that flow will be had, as above described. Movement of the piston 34 toward the left will take place on rebound movement of the wheel supporting structure and the frame relatively, whereas movement of the piston 33 toward the right will take place on compression or movement of the wheel supporting structure and the frame. By adjusting the screw plugs 49, 50 and 66 axially, the spring force which must be overcome by fluid pressure to open the associated valves can be adjusted.

The valve 71 is interposed in the passage 53 and one end is formed with a pair of oppositely disposed milled grooves 72 in the periphery, such grooves extending in an axial direction. The milled end of the valve 71 is assembled short of the end of the chamber 73 so that fluid can flow around the end of the valve from one groove to the other and thus connect the two parts of the passage 53. This valve is retained in its chamber by bushing 74 and one end 75 thereof projects beyond the casing for the attachment of control mechanism. By turning the valve 71, the size of the passage 53 communicating with the slots 72 can be adjusted and thereby regulate the flow of fluid so that the resistance offered to relative movement between the wheel supporting structure and the main frame can be varied.

When the valve 54 is turned so that the slot 57 does not register with the passages 52 and 53, then there can be no flow therethrough from the chamber 31 to the chamber 32 or vice versa. In order to relieve the pressure developed by severe shocks occurring when this valve 54 is closed to the passages 52 and 53, I provide another circuit connecting with the passage 44 through means of the circular groove 56 around the valve 54. Communicating with the valve chamber 51 and the groove 56 is a passage 76 terminating in a chamber 77 closed at the exterior by an axially adjustable plug 78. This chamber communicates with the passage 45 which forms a continuation of passage 43. Another passage 79 leads from the passage 76 to a chamber 80 which is closed at its outer end by an axially adjustable screw plug 81. The chambers 80 and 77 are connected by a passage 82. In the chamber 77 is a valve 83 having a head engageable with the shoulder of the casing forming the junction between the passage 76 and the chamber 77, such valve being normally seated by a coil spring 84. A valve 85 normally engages the shoulder forming the junction between the passage 82 and the chamber 80, such valve being normally seated by the coil spring 86.

It will be observed that the valves 83 and 85 close in opposite directions and hence fluid flowing from the chamber 31 will move from the passage 45 into the chamber 77 through the passage 82, the chamber 80, and the passages 79 and 76 where it will move into the passage 44 around the groove 56 in the valve 54. The fluid flowing from the chamber 32 to the chamber 31 will move through the passages 42 and 44, around the groove 56 in the valve 54 into the passage 76, past the valve 83 into the chamber 77, and through the passage 45 from which it will move into the chamber 31 through the passage 43. The springs 84 and 86 exert a high pressure to prevent opening of the associated valves so that high pressure by the pistons 33 and 34 will be required in order to open the valves 83 and 85 to establish communication between the chambers 31 and 32. This circuit, as before explained, is in reality a relief effective when the flow is cut off through the normal circuit due to shutting off communication between the passage 44 and the passages 52 and 53.

Mechanism is associated with the valve 71 so that it can be regulated from the dash. On the end 75 of the valve extending from the casing is fixed an arm 87 and pivoted to such arm is a link 88 extending rearwardly to arm 89 fixed on a rotatable cross shaft 90 mounted between the frame side sills 10. An operating lever 91 is fixed to the shaft 90 and a link 92 connects such lever with a bell crank lever 93 mounted on the dash. Another link 94 connects this bell crank lever with a second bell crank lever 95 which is mounted on the dash above the first bell crank lever. An operating rod 96 extends through the dash 96', within grasp of the driver of the vehicle, and is connected to the bell crank lever 95 so that, upon reciprocation, the linkage between the bell crank lever 95 and the arms 87 of the front shock absorbers will be moved to turn the shaft 71. The fluid flow through passage 53 is thus regulated to vary the resistance to vertical movement of the wheel supporting structures and the frame relatively. Such mechanism is commonly known as the "ride control" for motor vehicles.

The valve 54 is controlled automatically and the arrangement is such that, when the vehicle is decelerating, the valves 54 will be turned so that flow between the passage 44 and the passages 52 and 53 is substantially cut off. With the present type of suspension mechanism, there is considerable resiliency at the front end of the vehicle which results in the frame diving downwardly toward the front wheel supporting structures when the brakes are applied. Through means of the control valves 54, the shock absorber resistance will be made such as to substantially eliminate this diving, there being provision made for relief in the shock absorbers in case extraordinary pressure is developed therein due to the wheels encountering a sharp unevenness in the road while the valves 54 are closed. Each of the road wheels is equipped with a brake drum, as indicated at 97, and within each of these drums is a conventional type of expanding and contracting band 98 controlled by a cam member, as indicated at 99. These cam control members are mounted on shafts 100 which have arms 101 extending therefrom connected with brake rods 102. The front and rear brake rods at each side of the vehicle are connected to a lever 103 fixed on a rotatable cross shaft 104 carried by the side sills of the main frame. A pedal 105 is mounted on a shaft 106 carried by one of the side sills and link 107 connects the pedal with arm 108 fixed on shaft 104 and a spring 112 connected to the pedal and a side sill manually maintains the brake mechanism in released position. In Fig. 1 the arm 109 of an inertia member 110 is fixed on the extending end 55 of each front shock absorber valve 54. A coil spring 111 is connected with each inertia member and with the front cross frame member 11. The inertia members will swing forwardly when the vehicle is decelerating and such movement will rotate the valves 54 and cut off communication between the passage 44 and the passages 52 and 53 so that the front shock absorbers thereby become substantially rigid units which will prevent deflection of the springs and diving of the front end of the body. The springs 111 will return the inertia members to a position whereby the valves 54 will establish communication between the passage 44 and the passages 52 and 53 in each shock absorber when vehicle deceleration ceases.

In the modified form of automatic valve control means shown in Fig. 3, the ends 55 of the valves 54 in the front shock absorbers each have a rock lever 112 fixed thereto. Such rock levers are preferably co-axial and are provided at their adjacent ends with links 113 between which is fixed a shaft 114 carrying a weighted roller 115. A housing 116 is secured to the front cross frame member 11 and encloses the weighted roller, the sides of such casing having slots 117 therein through which the shaft 114 extends and is guided. Coil springs 118 are connected at one end to the front cross frame member and at the other end to the rock levers. Upon deceleration of the vehicle due to application of the brakes or other causes, the inertia member 115 moves forwardly in the casing carrying the shaft 114 therewith and this movement of the shaft will swing the rock levers 112 therewith through the connecting links 113. Such movement of the rock levers will transmit similar movement to the associated valves 54 and will move them in a direction such that the slot 57 in each valve member is turned to cut off flow between the passage 44 and the passages 52 and 53 and, under such circumstance, the front shock absorbers become substantially rigid units which resist any relative vertical movement between the frame and the wheel carriers. When deceleration ceases, then the springs 118 will return the rock levers to the position shown in Fig. 3 whereupon the associated valves will permit flow between the passage 44 and the passages 52 and 53 in each of the front shock absorbers.

It will be seen that I have provided automatic control mechanism for shock absorbers which is effective during vehicle deceleration to restrict fluid flow in the shock absorbers. By means of such automatic control, there will be no diving of the forward end of the body toward the wheel carriers when the vehicle is decelerating due to application of the brakes or other causes and therefore steering will not be dangerous at such time and the riding comfort of the passengers will be materially improved.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a road vehicle, the combination with a fluid shock absorber flow control valve, of actuator means for the valve comprising spring means to normally hold the valve open, and inertia means, said inertia means being effective during vehicle deceleration to move the valve in a direction to reduce the flow thereby.

2. In a road vehicle, a suspension system comprising a pair of fluid shock absorbers, a valve member in each shock absorber controlling fluid flow therein, means connecting said valve members to cause their similar and simultaneous movement, inertia means associated with said connecting means and effective during vehicle deceleration to cause adjustment of the valves in a closing direction, and spring means associated with said connecting means opposing movement thereof by said inertia means.

3. In a road vehicle, the combination with a shock absorber having flow control means associated therewith, of actuator mechanism connected to said control means comprising an inertia member and a spring, said spring normally urging said control means toward opening position and said inertia member urging said control means in a direction resisting flow in the shock absorber upon deceleration of the vehicle.

4. In a road vehicle, the combination with a shock absorber having adjustable flow checking means therein, of means normally holding said checking means in wide open relation, and means effective only during deceleration of the vehicle for moving said checking means toward closed position.

5. In a road vehicle suspension system, a pair of oppositely disposed shock absorbers each having a valve therein for controlling fluid flow, an actuator for each of said valves, means normally holding said actuator in a relation to fully open said valves, and means effective during deceleration of the vehicle to move said actuators simultaneously in a direction to close said valves.

6. In a road vehicle suspension system, a pair of oppositely disposed fluid shock absorbers each having a valve therein for controlling fluid flow, an actuator associated with each valve, a spring connected with each actuator to normally hold the same in a relation to fully open said valves, and an inertia member connected to simultaneously operate said actuators upon deceleration of the vehicle.

7. In a road vehicle, a suspension system comprising a pair of oppositely disposed fluid shock absorbers each having a valve member therein for controlling fluid flow, an actuator for each valve, a weighted roller intermediate said actuators, connecting means between said roller and said actuators, and spring means associated with said actuators to normally hold them in a relation to maintain said valves in open position, said weighted roller being moved upon deceleration of the vehicle to transmit motion to said actuators in valve closing direction.

CLYDE R. PATON.